July 21, 1931.   F. S. BOLTZ   1,815,543
TANK
Original Filed Jan. 20, 1928
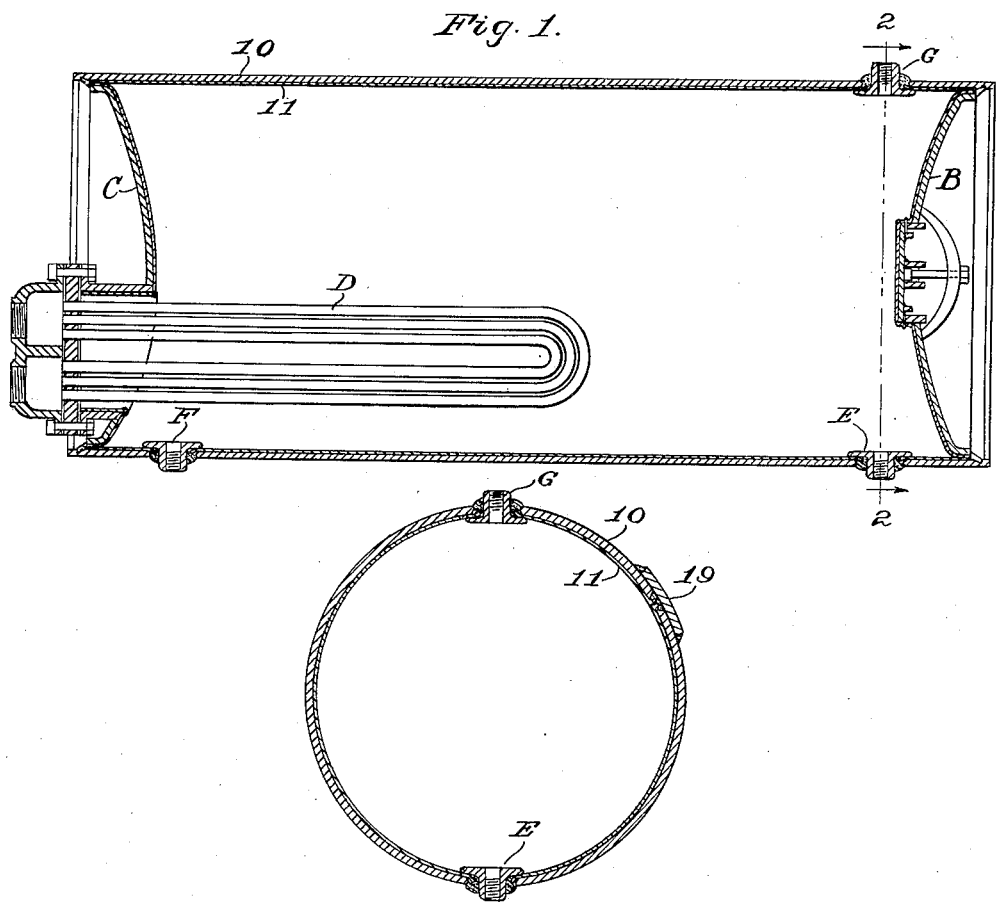
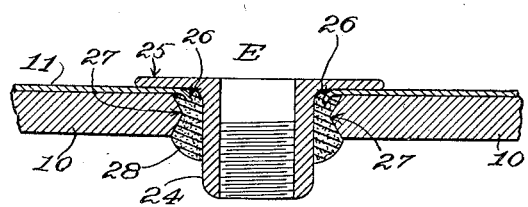
Inventor:
Fred S. Boltz
By Macleod, Calver, Copeland & Dike
Attorneys.

Patented July 21, 1931

1,815,543

UNITED STATES PATENT OFFICE

FRED S. BOLTZ, OF MANSFIELD, MASSACHUSETTS

TANK

Original application filed January 20, 1928, Serial No. 248,146. Divided and this application filed May 16, 1929. Serial No. 363,514.

The invention relates to an improvement in tanks. It is especially intended for application to tanks which are intended for use as containers for hot water or other liquids or substances which have a tendency to corrode metal. When the tank is made entirely of sheet steel or other corrodible metal, it soon becomes corroded thereby causing the tank to leak and discoloring the liquid in the tank. The use of non-corrodible metal for the entire tank is very expensive if the sheets of which the tank is made are sufficiently thick to give the necessary strength. It has, therefore, become common to make the tank with an inner shell or lining of non-corrodible metal and with an outer or reenforcing shell of steel or other relatively cheap metal which is corrodible.

With such construction, after the metal corrodes it soon begins to leak around the joints. This is especially liable to occur around the bung holes and other outlet and inlet orifices.

This application is a division of an application filed by me January 20, 1928, Serial No. 248,146, and relates to the nipples for the inlet and outlet orifices.

One feature of the invention consists in providing a special non-corrodible construction of nipples and joints therefor at the filling and draw-off opening.

The invention will be fully understood from the following description when taken in connection with the accompanying drawings and the novel features thereof will be pointed out and clearly defined in the claims at the close of this specification.

Fig. 1 is a longitudinal section of a tank embodying the invention.

Fig. 2 is a section on line 2—2, Fig. 1.

Fig. 3 is an enlarged sectional view through one of the nipples.

Referring to the drawings, there is shown at 10 a tubular outer or reenforcing shell of the tank which may be made of steel or other corrodible sheet metal and at 11 is shown an inner shell of non-corrodible sheet metal, preferably brass, copper or monel. Each of these shells may be made of sheet metal rolled into cylindrical form and having a longitudinal union or joint at the meeting edges. The ends of the tank are provided respectively with the heads B, C. At D is shown a heating element connected with the head C in any suitable manner. Any suitable heating element may be used for this purpose or the heating element may be omitted. At E, F and G are shown respectively the inlet, outlet and blow-off nipples.

The nipple E has a tubular body portion 24 and an annular flange 25 on its inner end which engages the lining 11 of the tank. The outside diameter of the nipple 24 is somewhat less than the diameter of the aperture in the non-corrodible lining 11 through which the nipple extends, said lining being formed with an outwardly turned annular lip 26 leaving an annular space between the periphery of said flange 26 and the outer periphery of the nipple 24.

The aperture through the wall of the outer shell 10 is of slightly greater diameter than the aperture in the lining 11. Preferably the wall of the aperture in the shell 10 is wedge-shaped in cross section as shown at 27, flaring from the middle both outwardly and inwardly. The space between the nipple and the wall of the orifice in the lining and the reenforcing member 10 is filled with solder or welding material 28, preferably non-corrodible.

What I claim is:

1. A tank comprising an outer metallic shell and an inner lining shell, said lining shell being of non-corrodible sheet metal, said shells being formed with an orifice passing through both shells to receive a nipple, the rim of the orifice in the lining shell being formed with an outwardly extending flange, the orifice in the outer shell being of larger diameter than the orifice in the lining member and formed with a bevelled edge, a nipple inserted in said orifice, said nipple being of non-corrodible metal of less diameter than said orifice and a non-corrodible substance in the space between the nipple and the said lining member and outer shell uniting the nipple to both of said shells.

2. A tank comprising an outer metallic shell and an inner lining shell, said lining shell being of non-corrodible sheet metal, said shells being formed with an orifice passing through both shells to receive a nipple, the rim of the orifice in the lining shell being formed with an outwardly extending flange, the orifice in the outer shell being of larger diameter than the orifice in the lining member, a nipple inserted in said orifice, said nipple being of less diameter than said orifice and a fusible metallic substance in the space between the nipple and the said lining member and outer shell uniting the nipple to both of said shells.

3. A tank comprising an outer metallic shell and an inner lining shell, said shells being formed with an orifice through both shells to receive a nipple, the orifice in the outer shell being formed with a bevelled edge, a nipple inserted in said orifice, said nipple being of less diameter than said orifice and a non-corrodible substance in the space between the nipple and the lining member and outer shell uniting the nipple to both of said shells.
In testimony whereof I affix my signature.

FRED S. BOLTZ.